United States Patent
De Carteret et al.

(10) Patent No.: US 10,597,070 B2
(45) Date of Patent: Mar. 24, 2020

(54) METHODS AND SYSTEMS FOR TRACTION STEER DETECTION

(71) Applicant: GM GLOBAL TECHNOLOGY OPERATIONS LLC, Detroit, MI (US)

(72) Inventors: David T. De Carteret, Fenton, MI (US); Gregory K. Peterson, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 15/719,982

(22) Filed: Sep. 29, 2017

(65) Prior Publication Data

US 2019/0100236 A1    Apr. 4, 2019

(51) Int. Cl.
 *B62D 5/04* (2006.01)
 *B62D 15/02* (2006.01)
 *B62D 6/00* (2006.01)

(52) U.S. Cl.
 CPC ......... *B62D 5/0481* (2013.01); *B62D 5/0463* (2013.01); *B62D 6/002* (2013.01); *B62D 6/008* (2013.01); *B62D 15/025* (2013.01); *B62D 15/0245* (2013.01)

(58) Field of Classification Search
 USPC .......................................................... 701/41
 See application file for complete search history.

(56) References Cited

U.S. PATENT DOCUMENTS

| | | | | |
|---|---|---|---|---|
| 6,405,113 B1* | 6/2002 | Yamawaki | ............... | B62D 6/04 180/446 |
| 2006/0070794 A1* | 4/2006 | Fujita | ................. | B62D 15/0245 180/446 |
| 2007/0043490 A1* | 2/2007 | Yokota | ................... | B62D 5/046 701/41 |
| 2009/0204292 A1* | 8/2009 | Tate | ........................ | B60T 8/175 701/41 |
| 2010/0087989 A1* | 4/2010 | Yamanaka | ........... | B62D 5/0466 701/41 |
| 2012/0226399 A1* | 9/2012 | Bergfjord | ................ | B60L 15/20 701/22 |
| 2012/0283907 A1* | 11/2012 | Lee | ..................... | B60T 8/17557 701/31.9 |
| 2013/0190959 A1* | 7/2013 | Hammer | ............. | G01M 17/007 701/22 |
| 2016/0236679 A1* | 8/2016 | Inoue | .................... | B60W 10/20 |
| 2016/0297439 A1* | 10/2016 | Inoue | ................... | B60W 10/184 |
| 2017/0210414 A1* | 7/2017 | Sato | .................... | B60W 30/045 |

\* cited by examiner

*Primary Examiner* — Tyler D Paige
(74) *Attorney, Agent, or Firm* — Quinn IP Law

(57) ABSTRACT

Embodiments discussed herein enable detection of traction steer using measured and expected values of steering system data, such as, for example and without limitation, motor current, motor torque, motor position, motor velocity, steering wheel angle, and steering column torque. In some embodiments, the measured steering system data is compared to expected signal values, based on vehicle operating conditions, to determine if the vehicle is experiencing a traction steer event. In some embodiments, using known relationships between two or more steering system signals, a traction steer event is identified if an unexpected relationship is determined.

13 Claims, 2 Drawing Sheets

METHODS AND SYSTEMS FOR TRACTION STEER DETECTION

INTRODUCTION

The present invention relates generally to automotive control systems, and more particularly relates to methods and systems used in a vehicular setting for detection of traction steer.

Traction steer, or more broadly, torque steer, is a phenomenon that describes a steering moment generated about a vehicle's kingpin axes that is of sufficient size to overcome the typical forces that return a steering wheel toward the straight-ahead position. Such a steering moment may be caused by a tire having more traction during acceleration than the opposing tire. The resulting net force in the steering rack generates a decrease in steering wheel centering torque, and possibly results in a positive steering wheel torque in a direction that is not desired by the driver.

It is desirable to control traction steer in vehicles to the extent possible. Various methodologies to identify and compensate for traction steer have been proposed. For example, one method limits torque to a predefined level in first gear. When the accelerator pedal position is depressed to the extent that the driver is requesting more torque than the predefined level, only the maximum allowed torque is produced by the engine.

The above example method describes a passive compensation system, in that the vehicle torque is reduced arbitrarily, without regard to whether a traction steer event is occurring. Accordingly, a need exists for a more effective traction steer identification system and method. Furthermore, other desirable features and characteristics of the present invention will become apparent from the subsequent detailed description and the appended claims, taken in conjunction with the accompanying drawings and the foregoing technical field and background.

SUMMARY

Embodiments according to the present disclosure provide a number of advantages. For example, embodiments according to the present disclosure enable detection of traction steer using measured and expected values of steering system data, such as, for example and without limitation, motor current, motor torque, motor position, motor velocity, steering wheel angle, and steering column torque. In some embodiments, the measured steering system data is compared to expected signal values, based on vehicle operating conditions, to determine if the vehicle is experiencing a traction steer event. In some embodiments, using known relationships between two or more steering system signals, a traction steer event is identified if an unexpected relationship is determined.

In one aspect, a method for detection of a traction steer event includes receiving steering system data from one or more vehicle sensors, determining a current operating condition of a vehicle, and comparing the steering system data received from the one or more vehicle sensors to an expected value of the steering system data to determine if a traction steer event has occurred.

In some aspects, if the traction steer event is determined to have occurred, the method further includes transmitting a notification to a vehicle operator.

In some aspects, the expected value of the steering system data is obtained from a lookup table of expected steering system characteristics for a plurality of vehicle operating conditions.

In some aspects, the steering system data includes one or more of motor current, motor torque, motor position, motor velocity, steering wheel angle, and steering column torque.

In some aspects, comparing the steering system data to an expected value of the steering system data includes comparing a measured motor current with an expected motor current.

In some aspects, comparing the steering system data to an expected value of the steering system data includes comparing a measured steering angle with an expected steering angle.

In some aspects, comparing the steering system data to an expected value of the steering system data includes comparing a measured steering column torque with an expected steering column torque.

In another aspect, a method for detection of a traction steer event includes receiving first steering system data from one or more vehicle sensors, receiving second steering system data from one or more vehicle sensors, determining a relationship between the first and second steering system data, and comparing the relationship between the first and second steering system data to an expected relationship between the first and second steering system data to determine if a traction steer event has occurred.

In some aspects, if the traction steer event is determined to have occurred, the method includes transmitting a notification to a vehicle operator.

In some aspects, the expected relationship between the first and second steering system data is obtained from a lookup table of expected relationships between steering system data.

In some aspects, the first steering system data includes one of motor current, motor torque, motor position, motor velocity, steering wheel angle, and steering column torque.

In some aspects, the second steering system data includes one of motor current, motor torque, motor position, motor velocity, steering wheel angle, and steering column torque.

In some aspects, determining a relationship between the first and second steering system data includes determining a relationship between a measured motor current and a measured steering column torque.

In yet another aspect, a system for detecting and compensating for a traction steer event includes means for receiving steering system data from one or more vehicle sensors, means for determining a current operating condition of a vehicle, and means for comparing the steering system data received from the one or more vehicle sensors to an expected value of the steering system data to determine if a traction steer event has occurred.

In some aspects, the means for comparing the steering system data to an expected value of the steering system data includes means for comparing a measured motor current with an expected motor current.

In some aspects, the means for comparing the steering system data to an expected value of the steering system data includes means for comparing a measured steering angle with an expected steering angle.

In some aspects, the means for comparing the steering system data to an expected value of the steering system data includes means for comparing a measured steering column torque with an expected steering column torque.

BRIEF DESCRIPTION OF THE DRAWINGS

The present disclosure will be described in conjunction with the following figures, wherein like numerals denote like elements.

Figure 1:
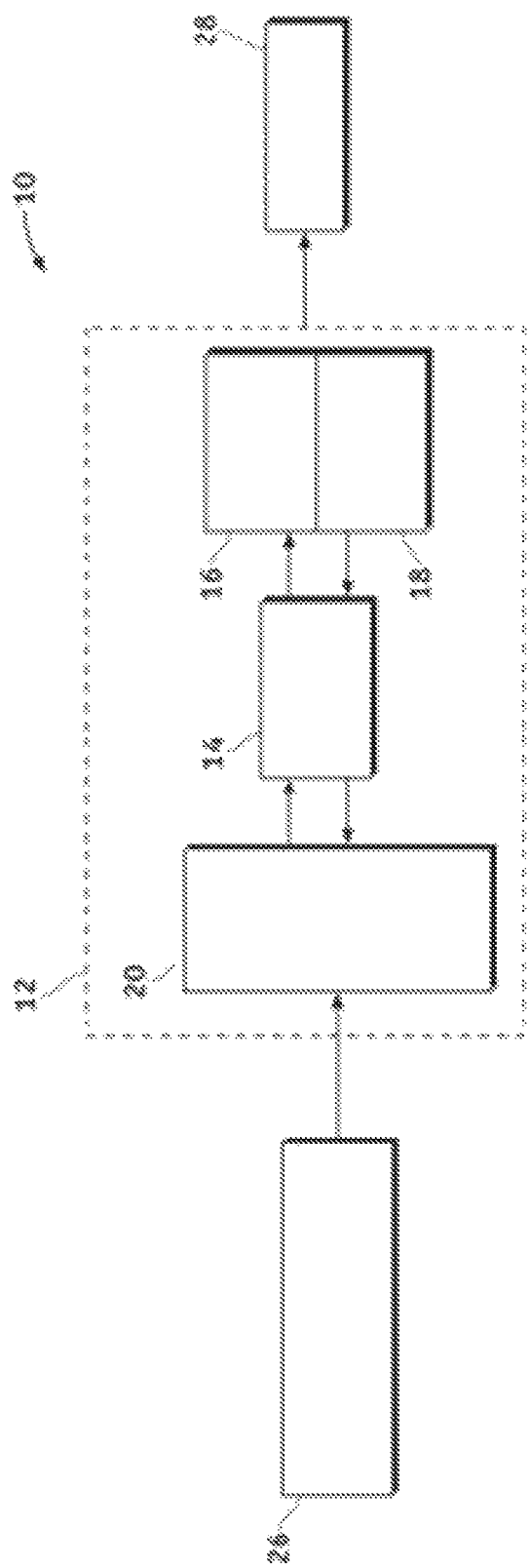
FIG. 1 is a block diagram of a system for detecting and compensating for traction steer.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The following description presents a novel system and method for effectively identifying traction steer. Use of the term "driven" may refer to a wheel driven by the engine (e.g., a wheel connected to the drivetrain). A traction steer condition may occur when, while a vehicle is turning, an inside wheel slips more than a threshold amount relative to an outside wheel.

A variety of vehicle parameters may be examined to identify the onset of a traction steer event, including, in some embodiments, steering system signals. One or more of the measured steering system signals are compared to an expected operating condition to identify a transition in steering system forces that identifies the onset or presence of a traction steer event.

FIG. 1 illustrates an exemplary system 10 for detecting a traction steer event. Once a traction steer event is detected, in some embodiments, system 10 may then direct various components 28 of the vehicle to compensate for the traction steer event. A processor/controller device 12 includes a central processing unit (CPU) 14 coupled to memory devices 16 and 18, which can include such memory as random access memory (RAM) 16, non-volatile read only memory (NVROM) 18, and possibly other mass storage devices. CPU 14 is coupled through an input/output (I/O) interface 20 to at least one of a plurality of sensors 26 which provide operational data from a vehicle, such as wheel speed, steering column torque, steering motor current, steering motor torque, steering motor position, steering motor velocity, steering motor acceleration, steering wheel force, and steering wheel angle, to the CPU 14. Sensors 26 may be configured to measure various operational parameters of the vehicle as will be further described.

Figure 2:
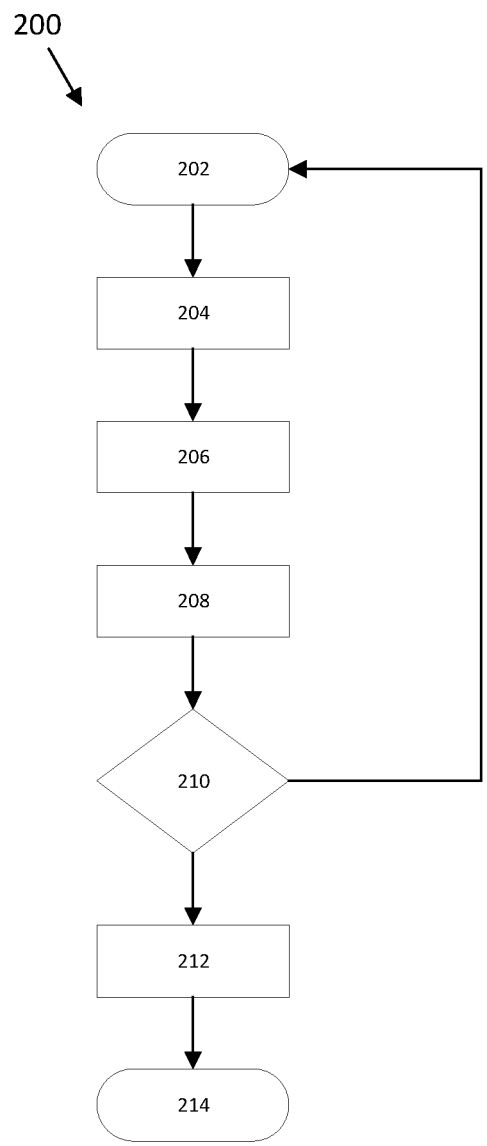
FIG. 2 is a flow chart diagram of an exemplary method of detecting traction steer.

FIG. 2 illustrates an exemplary method 200 for determining a traction steer event. The method 200 can be utilized in connection with the system 10 having one or more sensors 26. The order of operation of the method 200 is not limited to the sequential execution as illustrated in FIG. 2 but may be performed in one or more varying orders, or steps may be performed simultaneously, as applicable in accordance with the present disclosure.

In some embodiments, measured steering system data, such as, for example and without limitation, motor current, motor torque, motor position, motor velocity, steering wheel angle, and steering column torque, is compared to expected signal values, based on vehicle operating conditions, to determine if the vehicle is experiencing a traction steer event. In some embodiments, using known relationships between two or more steering system signals, a traction steer event is identified if an unexpected relationship is determined.

The method 200 begins at 202 and proceeds to 204. At 204 the controller 12 receives steering system data from one or more of the sensors 26. In some embodiments, the steering system data includes one or more of motor current, motor torque, motor position, motor velocity, steering wheel angle, and steering column torque, for example and without limitation. Next, at 206, the controller 12 determines the current operating condition of the vehicle. Determination of the current operating condition includes, in some embodiments, receipt and interpretation of sensor data from other vehicle controllers regarding vehicle characteristics including, for example and without limitation, vehicle speed, throttle position, brake pedal position, commanded torque, and steering angle. The current operating condition determined at 206 informs the controller 12, in some embodiments, the expected value of the steering system data.

Next, at 208, the controller 12 compares the steering system data received from one or more of the sensors 26 to the expected value(s) of the steering system data. This comparison of current versus expected relates specifically to the comparison of various operating parameters of the vehicle. For example and without limitation, in one embodiment, steering system motor current data received from one of the sensors 26 is compared to a lookup table of expected motor current based on the current operating condition. In some embodiments, one or more lookup tables of expected values of steering system data for various vehicle operating conditions is stored within the controller 12, such as, for example and without limitation, expected steering column torque and expected steering angle. In some embodiments, a measured steering column torque is compared to an expected steering column torque. In some embodiments, a measured steering angle is compared to an expected steering angle.

At 210, the controller 12 determines whether the comparison between the measured steering system data and the expected steering system data is within a predetermined range. For example, and without limitation, if the measured steering system data and the expected steering system data is within a predetermined percentage, such as 2%, the controller 12 determines that a traction steer event has not occurred, and the method 200 returns to the start at 202.

However, if the comparison between the measured steering system data and the expected steering system data is not within the predetermined range, the method 200 proceeds to 212. At 212, the controller 12 transmits a notification of a traction steer event. In some embodiments, the notification is a visual, auditory, or haptic communication to the vehicle operator of the traction steer event. In some embodiments, the controller 12 transmits one or more control signals to direct various components 28 of the vehicle to compensate for the traction steer event. The method 200 proceeds to 214 and ends.

Figure 3:
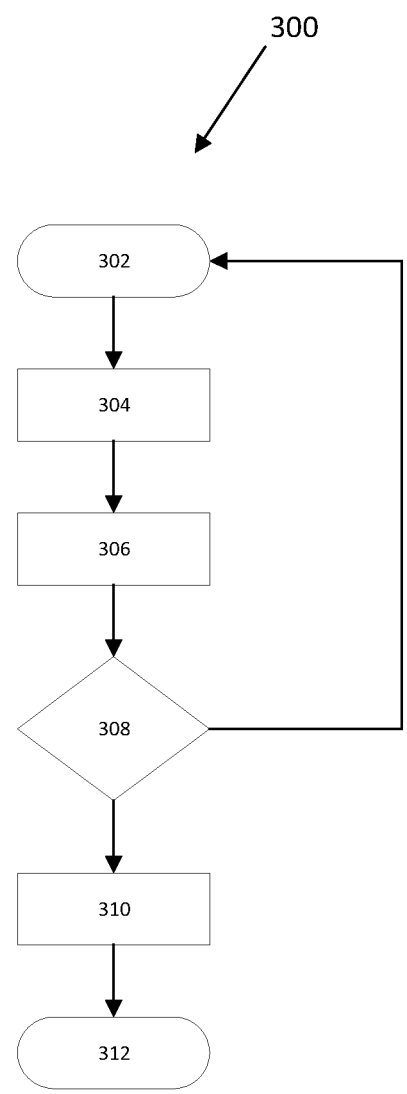
FIG. 3 is a flow chart diagram of another exemplary method of detecting traction steer.

FIG. 3 illustrates an exemplary method 300 for determining a traction steer event. The method 300 can be utilized in connection with the system 10 having one or more sensors 26. The order of operation of the method 300 is not limited to the sequential execution as illustrated in FIG. 3 but may be performed in one or more varying orders, or steps may be performed simultaneously, as applicable in accordance with the present disclosure.

In some embodiments, using known relationships between two or more steering system signals such as, for example and without limitation, motor current, motor torque, motor position, motor velocity, steering wheel angle, and steering column torque, a traction steer event is identified if indicates an unexpected relationship.

The method 300 begins at 302 and proceeds to 304. At 304 the controller 12 receives steering system data from one or more of the sensors 26. The controller also receives other vehicle information from other vehicle controllers, such as, but not limited to speed, throttle position, brake pedal position, and commanded torque, to determine the current operating state of the vehicle. In some embodiments, the steering system data includes one or more of motor current, motor torque, motor position, motor velocity, steering wheel angle, and steering column torque, for example and without limitation. At 304, the controller 12 also determines the current operating condition of the vehicle. Determination of the current operating condition includes, in some embodiments, receipt and interpretation of sensor data from other vehicle controllers regarding vehicle characteristics including, for example and without limitation, vehicle speed, throttle position, brake pedal position, commanded torque, and steering angle. The current operating condition determined at 304 informs the controller 12, in some embodiments, the expected value of the steering system data.

At 306, the controller 12 determines the relationship between one or more pairs of measured steering system data. For example, and without limitation, the controller 12 determines the relationship between the motor current and the steering column torque.

Next, at 308, the controller 12 determines whether the relationship between the one or more pairs of measured steering system data is within a predetermined range. For example, and without limitation, if the relationship is within a predetermined percentage, such as 2%, the controller 12 determines that a traction steer event has not occurred, and the method 300 returns to the start at 302.

However, if the relationship is not within the predetermined range, the method 300 proceeds to 310. At 310, the controller 12 transmits a notification of a traction steer event. In some embodiments, the notification is a visual, auditory, or haptic communication to the vehicle operator of the traction steer event. In some embodiments, the controller 12 transmits one or more control signals to direct various components 28 of the vehicle to compensate for the traction steer event. The method 300 proceeds to 312 and ends.

Use of the foregoing techniques provides a novel and effective approach for determining when a traction steer event has occurred. The methods can address conditions which previous approaches do not take into account, and provide better analysis under real dynamic conditions.

Various aspects of the foregoing description may be embodied as a computer program product. The computer program product may comprise computer-readable storage mediums, such as the aforementioned memory 16 and 18 (FIG. 1), or other mediums such as a digital versatile disk (DVD), compact disk (CD) and the like. The storage medium may have computer-readable program code portions, such as the above instructions, stored therein. The instructions may include executable portions for carrying out various steps or various embodiments of the above description.

It should be emphasized that many variations and modifications may be made to the herein-described embodiments the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for detection of a traction steer event of a vehicle, comprising:
    providing a first vehicle sensor configured to capture steering system data, a second vehicle sensor configured to capture current operating condition data, and a controller in electronic communication with the first and second vehicle sensors;
    receiving, by the controller, the steering system data from the first vehicle sensor, the steering system data including one or more of a motor current, a motor torque, a motor position, a motor velocity, a steering wheel angle, and a steering column torque;
    receiving, by the controller, current operating condition data of the vehicle from the second vehicle sensor;
    determining, by the controller, a current operating condition of the vehicle from the current operating condition data, the current operating condition including one or more of a vehicle speed, a commanded steering column torque, and a current steering wheel angle;
    determining, by the controller, an expected value of the steering system data from the current operating condition; and
    comparing, by the controller, the steering system data received from the first vehicle sensor to the expected value of the steering system data to determine if a traction steer event has occurred.

2. The method of claim 1, wherein if the traction steer event is determined to have occurred, transmitting a notification to a vehicle operator.

3. The method of claim 1, wherein the expected value of the steering system data is obtained from a lookup table of expected steering system characteristics for a plurality of vehicle operating conditions.

4. The method of claim 1, wherein comparing the steering system data to an expected value of the steering system data includes comparing a measured motor current with an expected motor current.

5. The method of claim 1, wherein comparing the steering system data to an expected value of the steering system data includes comparing a measured steering angle with an expected steering angle.

6. The method of claim 1, wherein comparing the steering system data to an expected value of the steering system data includes comparing a measured steering column torque with an expected steering column torque.

7. A method for detection of a traction steer event of a vehicle, comprising:
providing a first vehicle sensor configured to capture first steering system data, a second vehicle sensor configured to capture second steering system condition data, and a controller in electronic communication with the first and second vehicle sensors;
receiving, by the controller, first steering system data from the first vehicle sensor, the first steering system data including a measured motor current;
receiving, by the controller, the second steering system data from the second vehicle sensor, the second steering system data including a measured steering column torque;
determining, by the controller, a relationship between the measured motor current and the measured steering column torque; and
comparing, by the controller, the measured motor current and the measured steering column torque to determine when an expected relationship between the measured motor current and measured steering column torque is within a predetermined range; and
when the expected relationship is not within the predetermined range, determining, by the controller, that a traction steer event has occurred.

8. The method of claim 7, wherein if the traction steer event is determined to have occurred, transmitting a notification to a vehicle operator.

9. The method of claim 7, wherein the expected relationship between the first and second steering system data is obtained from a lookup table of expected relationships between steering system data.

10. A system for detecting and compensating for a traction steer event of a vehicle, comprising:
one or more vehicle sensors configured to capture steering system data, the steering system data including one or more of a motor current, a motor torque, a motor position, a motor velocity, a steering wheel angle, and a steering column torque; and
a controller in electronic communication with the one or more vehicle sensors, the controller configured to:
determine a current operating condition of the vehicle; and
compare the steering system data received from the one or more vehicle sensors to an expected value of the steering system data to determine when an expected relationship between the steering system data and the expected value of the steering system data is within a predetermined range; and
when the expected relationship is not within the predetermined range, determine that a traction steer event has occurred.

11. The system of claim 10, wherein comparing the steering system data to an expected value of the steering system data includes comparing a measured motor current with an expected motor current.

12. The system of claim 10, wherein comparing the steering system data to an expected value of the steering system data includes comparing a measured steering wheel angle with an expected steering wheel angle.

13. The system of claim 10, wherein comparing the steering system data to an expected value of the steering system data includes comparing a measured steering column torque with an expected steering column torque.

* * * * *